Figure 1B:
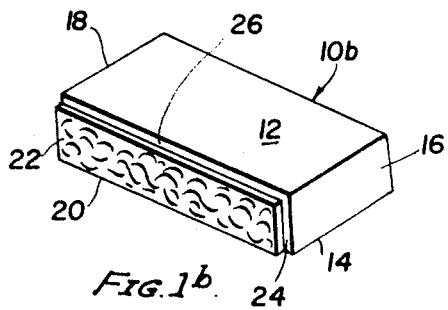
Figure 1C:
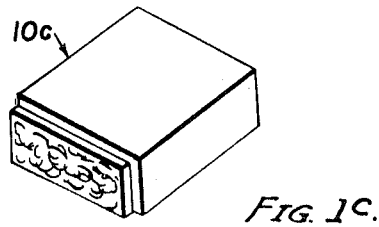
Figure 1A:
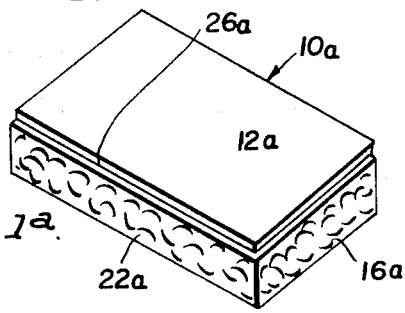

United States Patent

[11] 3,595,518

[72] Inventors  Edmond M. Gaudelli;
  Edward E. Shepler, both of 890 Narrows Run Road, Coraopolis, Pa. 15108
[21] Appl. No. 762,262
[22] Filed Sept. 16, 1968
[23] Division of Ser. No. 698,987, Jan. 18, 1968, Pat. No. 3,426,122
[45] Patented July 27, 1971

[54] MOLD BED FOR MOLDING CEMENTITIOUS PRODUCTS
5 Claims, 11 Drawing Figs.
[52] U.S. Cl. .................................................. 249/163, 249/127, 249/155
[51] Int. Cl. .................................................. B41b11/60, B28b 7/06, B28b 7/20
[50] Field of Search .......................................... 249/163, 127, 74—76, 164, 165, 66, 155, 102, 15; 18/34, 39

[56] References Cited
UNITED STATES PATENTS
| 243,504 | 6/1881 | Carnell | 249/163 X |
| 733,735 | 7/1903 | McNamee | 249/165 |
| 1,184,117 | 5/1916 | Morley et al. | 249/127 |
| 1,690,462 | 11/1928 | Smith | 249/163 X |
| 2,342,743 | 2/1944 | Lutes et al. | 249/75 |
| 2,619,046 | 11/1952 | Henderson | 249/76 |

Primary Examiner—Charles W. Lanham
Assistant Examiner—R. L. Spicer, Jr.
Attorney—Jeffers and Young ABSTRACT: The present invention relates to a process for molding cement products which are used to make retaining walls. The molded product is made within a mold cavity having a resilient mold piece at the bottom of the mold cavity and which is held at the opposite ends thereof only, so that the mold piece will flex upwardly thereby providing gradual release between the mold piece and the molded article. In this way, the molded piece can be removed while still green and without producing breakage of the article during such removal.

INVENTORS.
EDMOND M. GAUDELLI,
EDWARD E. SHEPLER.

ATTORNEY

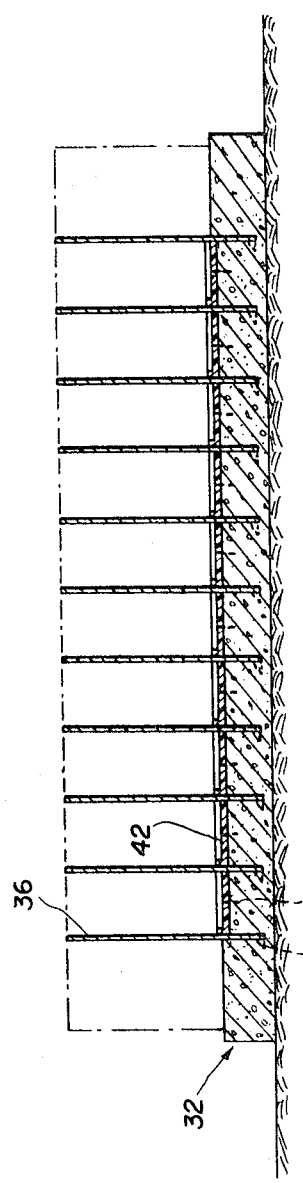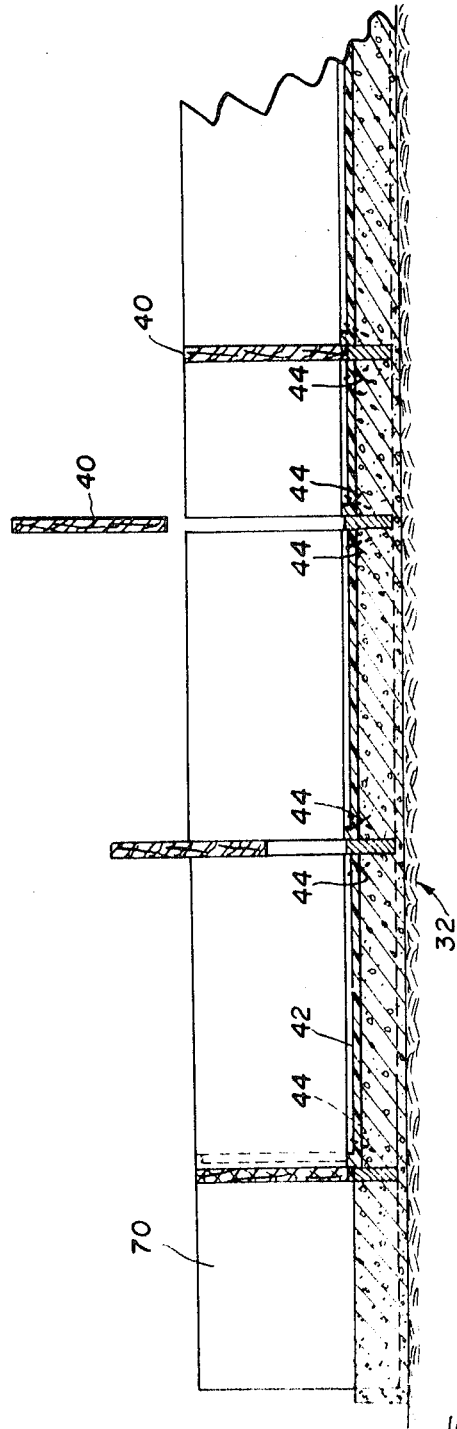

MOLD BED FOR MOLDING CEMENTITIOUS PRODUCTS

This application is a Divisional Application of our copending application, Ser. No. 698,987, filed Jan. 18, 1968 now U.S. Pat. No. 3,426,122, and titled "Improvements in Mold Bed for Molding Cementitious Products."

This invention relates to improvements in molded cementitious products, and more particularly to the process, and the molding equipment for producing an ornamental molded stone product using materials such as concrete or the like.

Many previous efforts have been made to produce a molded building stone both with and without ornamental configured surfaces. One of the major problems in producing a molded building stone product is to maintain each pair of opposite sides of the stone both parallel and flat, this being especially required for the load bearing sides of the stone product. A further problem relates to the obtainment of uniformity in dimension and strength for each of the molded products. Since the final structure produced by the molded stone product is made in multiples of the length, width, and height of the individual stone products, it is essential to make each product of uniform dimension so that it will fit properly in place.

Although the art has developed certain mold beds for producing cementitious building stone products, no such beds have been developed which combine both sufficient rigidity to produce a dimensionally accurate product and yet permit the finished product to be extracted from its mold cavity without damaging the product, and while the mold bed remains in a substantially completely assembled condition. Release of the product from the mold cavity is especially difficult where there is a contoured section of the mold cavity which imparts an irregular ornamental shape to the product, these surfaces generally being the location at which the product tends to lock itself to the mold cavity.

The previous mold beds for producing simultaneously a number of molded cementitious products, generally required a total disassembly of the mold bed in order to remove the finished product. Thus, following each mold operation the disassembled mold bed must be completely reconstructed, thus reducing the productive time of the mold because of the substantial periods between each pour.

It is one of the major objects of the present invention to correct these foregoing deficiencies of prior art molding methods and molding equipment and also to produce a molded product of improved quality, within a shorter period of time. The present invention proposes improved means for securing a molded stone product of accurate dimensions, of aesthetic appearance and of greater economy to produce by reason of only partially disassembling the mold bed between successive pours.

An overall object of the present invention is to provide an improved process for producing stone block structures which process is relatively simple to perform and can be used to carry out a variety of different molding operations to produce a product of uniform quality and within a relatively brief period of time so that stone block structures can be made which are less expensive and can be made in large quantities and at lower uniform prices. Moreover, the products are less likely to be damaged in the process of manufacture.

The process is simple to follow and once the mold bed is prepared, those having only slight experience can follow the procedure of making molded products after a relatively short training.

The process further encompasses an improved series of steps in which the mold bed is incompletely disassembled for each successive operation and is, therefore, in condition for reuse with minimum down time.

Figure 3:
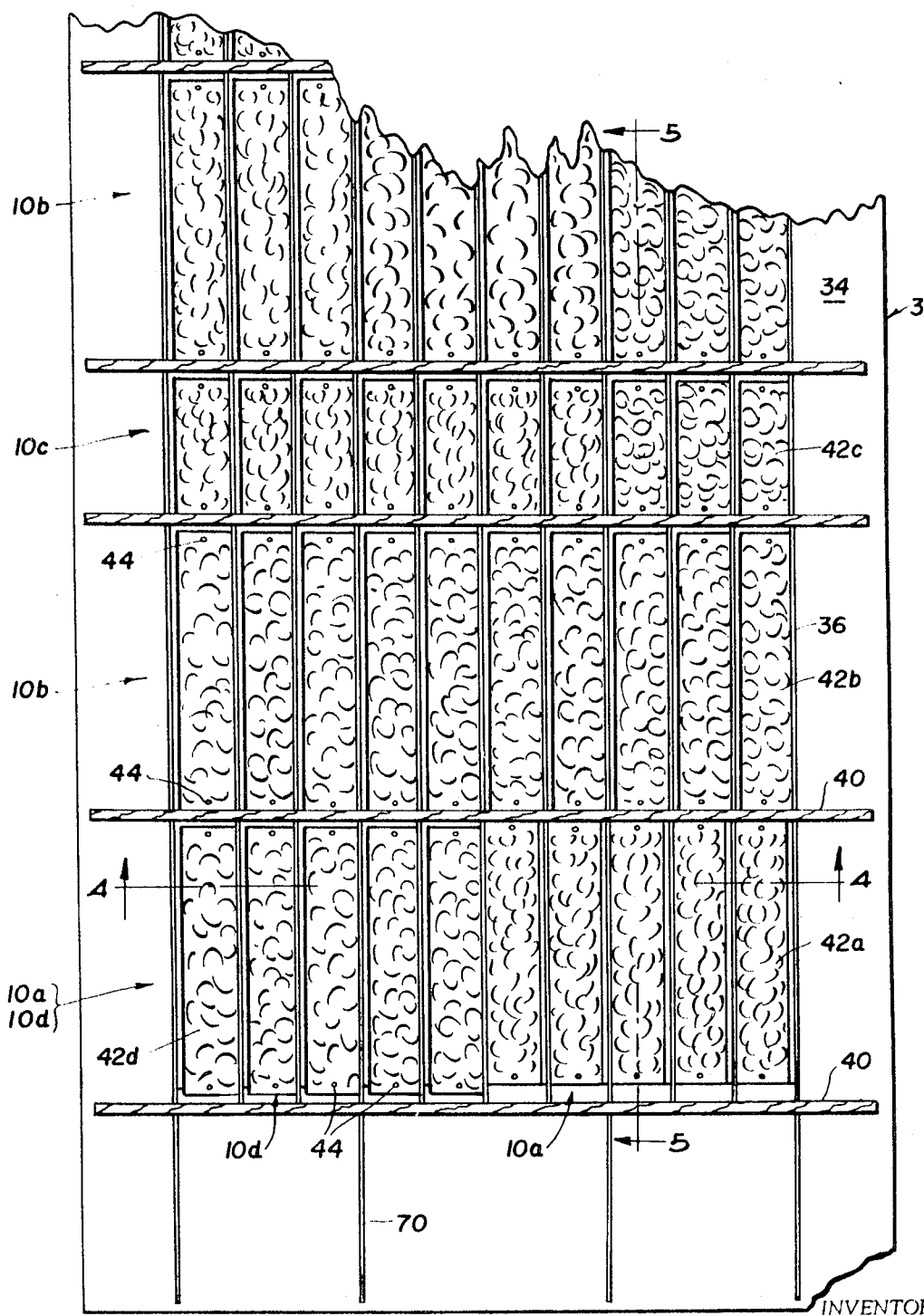

Other objects and features of the present invention will become apparent from a consideration of the following description which proceeds with reference to the accompanying drawings, wherein:

FIGS. 1A—1D are isometric views of various molded stone products which are constructed in accordance with the present invention;

FIGS. 2A—2D are the resilient mold pieces used in forming the corresponding products in FIGS. 1A—1D;

FIG. 3 is a plan view of a mold bed from which the articles of FIGS. 1A—1D are constructed; and FIGS. 4, 5, are section views taken respectively on lines IV–IV and V–V of FIG. 3.

Referring now to the drawings, the building stone blocks are designated generally by reference numerals 10A, 10B, 10C and 10D and are the various shapes necessary to form a complete structure, and constitute a right corner block 10A, a whole block 10B, a half block 10C and a left corner block 10D from which structures may be formed generally, as for example, retaining walls and the like. The most frequently used of the building units is the whole block 10B which is the principal building unit once a course is properly begun. Although the construction of each type of block will be considered, the following detailed description applied to the whole block 10B. The block 10B has opposite load-supporting faces 12 and 14 which must be held accurately to a parallel configuration so that as they are stacked one on top of the other the wall rises perpendicularly and will not bow outwardly or inwardly. The end faces 16 and 18 are likewise held in rigid conformance to a parallel configuration so that building stones on the same course can be butted against one another and still follow a true course line. It is also important that the end faces 16 and 18 of adjoining blocks meet squarely to avoid gaps between adjacent building blocks in the same course.

The front face 20 of the building block includes an ornamental portion 22 which is of irregular shape and resembles hewn stone or the like to provide an aesthetically pleasing facade for the completed wall. Along two transverse sides of the portion 22 are border sections 24 and 26 which simulate mortar joints between the stone block 10 and the adjoining blocks which are located surrounding the stone block 10. In order to make various structures, there are provided right corner blocks 10A, half blocks 10C and left corner blocks 10D. The half blocks are one-half the dimension of the block shown in FIG. 1, and the corner blocks 10A, 10D differ by reversing the principal dimensions of length and width. The ornamental portion 22A on the right corner block (FIG. 1A) extends the entire length of the block, and only one border section 26A is required to simulate the mortar joint; but, the other face 16A has two border sections which simulate two transverse mortar joints. The left corner block 10D has an ornamental face 22D with two mortar joints and an ornamental face 18D with a single joint.

The wall is constructed using a plurality of the stone blocks 10A—D as shown in FIG. 1, a horizontal course being constructed by laying one stone block next to the other so that one mortar joint portion 24 separates each pair of adjoining ends, this pattern being repeated until a horizontal course is constructed of the desired length. The next course is then started with a corner block or half block laid on the load bearing face 12 of the lower course so that the vertical mortar joints 24 are staggered from one course to the next higher course. The wall can extend in transverse directions by utilizing corner blocks as shown in FIGS. 1A and 1D or will utilize half blocks 10C. The courses can extend indefinitely.

The stone blocks 10 are made within a mold bed, designated generally by reference numeral 32 in FIG. 3, having a concrete base 34 wherein are mounted on edge a number of steel plates 36, each having a turned back corner 38 in order to anchor the embedded edge of the plate 36 firmly in place. Each plate is embedded about 3 inches or so within the concrete bed 34 to insure that the plate will be rigidly held in an upright position (FIG. 4). The spacing between adjacent plates 36 corresponds to the height "$h$" of the block shown in FIG. 1B. The length of the plate 36 corresponds with the length "$l$" of the block and the vertical dimension of the plate corresponds to the width "$w$" of the block. The whole blocks 10B are made in the mold bed labeled 10B (FIG. 3), the corner blocks 10A are made in cavities labeled 10A, left corner blocks in cavities 10D and half blocks in 10C.

There is provided a slot or open space between adjacent ends of the plates 36, the slots being aligned with one another to provide for insertion and removal of a divider board 40 which defines the end walls for the mold cavities and rests on the concrete bed 34.

At the bottom of each mold cavity is a hard resilient mold piece 42 which fits within a recess of the bed 34 and is held therein by screw nail pins 44 or the like which retain the ends of the mold piece 42 but permit a slight flexing at the center of the mold piece which distorts into a convex shape while the stone is being extracted from the mold cavity. Consequently, the extractive forces that are exerted upon the green block at the time they are extracted, are minimized. If it were required to overcome the cohesive forces between the entirety of the mold piece 42 and the block, then the cohesive forces might well exceed the ability of the block to cohere together and the block could be injured in the process of being extracted. The particular mold piece used is chosen in accordance with the particular block to be constructed. The whole block mold piece 42B has in addition to a contoured face 44B, which imparts an ornamental appearance to the face of the stone, two intersecting ridges 46 and 48 along two edges of the mold piece which extend slightly above the bed 34 and impress mortar-simulating borders 24 and 26, respectively. Between the inner edges of the borders 46, 48, and the face 45 is a slightly inclined taper 50, 52, to prevent locking of the stone within the mold cavity.

When constructing corner pieces, either "right" corner blocks or "left" corner blocks, there is located in upright position (FIG. 3) along one side of the mold cavity, an additional mold piece. In the case of a left corner block 10D a mold 54 is located in the cavity at the lower left-hand side of FIG. 3. The mold 54 has a face 56 which corresponds in contour with the face 44D of mold piece 42D, the two mold faces meeting at right angles. A raised border section 58 is at right angles to border section 59 of mold piece 42D to provide a mortar line 57 which is continuation of the simulated mortar line 26 at face 20 as shown in FIG. 1D. The mortar line 24 is provided by border section 61 of mold piece 42D.

When constructing a right corner block a mold piece 55 (FIG. 2A) is located upright and is at the lower right-hand part of the mold bed 32 in FIG. 1. In this case the upright mold 42A has border pieces 61 and 63 which form mortar lines 65, 67, in block 10A (FIG. 1A), the border 63 intersecting border 69 of mold piece 42A to make mortar line 26A.

Figure 1D:
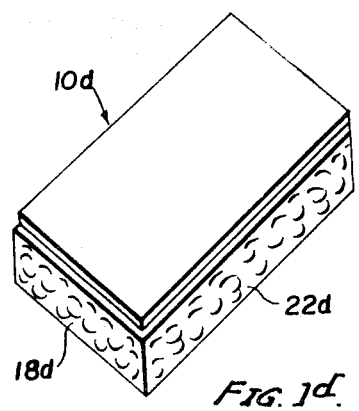
Figure 2B:
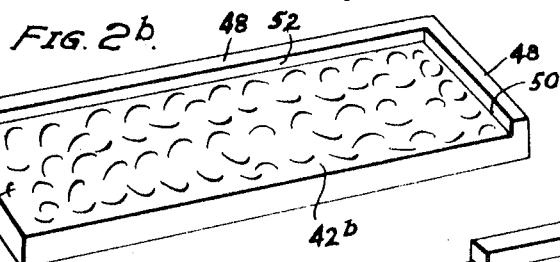
Figure 2C:
Figure 2D:
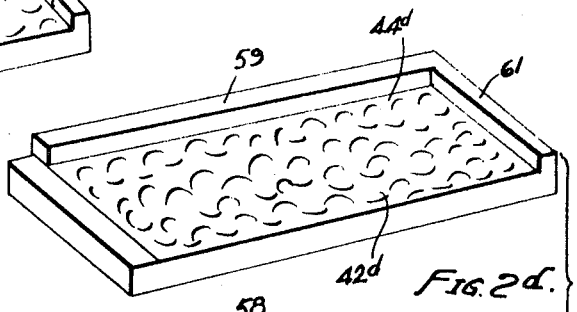
Figure 2A:
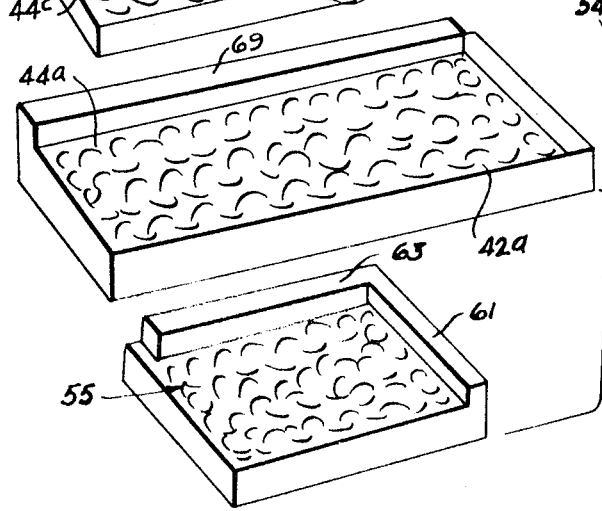

In addition to whole blocks, the mold cavities can also be proportioned as half blocks, row 10C (FIG. 3) by inserting a half mold 42C (FIG 2C) into the bottom of the mold cavity and the product (FIG. 1C) has one half the length "*l*" as the length of whole block 10B (FIG. 1B).

In operation, following each molding, the cavities as shown in FIG. 3 are emptied and the divider boards 40 removed. The dividers can, of course, be of any suitable composition but we have found that exterior plywood works satisfactorily for this purpose. The mold bed is cleared of sand and foreign material by compressed air and the plates 36 and mold pieces 42 at the bottom of the mold cavity are sprayed with a lightweight lubricating oil. The dividers 40 are then inserted in place within slots 38 and corner mold pieces located to construct the desired number and configuration of corner blocks, the end divider board 40 at the bottom of FIG. 3 being held upright by steel plates 70 as indicated at the bottom of FIG. 3.

A cementitious or concrete material of suitable flowability and composition, as for example, a 1—2½—3½ (cement, sand, pea gravel) is poured from a ready mix truck into the mold cavities and leveled off. A hooked stir rod is drawn through each mold cavity to release entrapped air.

The upright steel plates have sufficient rigidity that they will not distort from vertical position under the weight of the concrete and will therefore impart a true parallel shape to the load bearing faces 12 and 14 for the block. The dividers 40, being held fast between the ends of the plates within the notches 36 resist any substantial degree of movement, thus accurately defining the faces 16 and 18 of the blocks. The correct spacing and parallelism of the plates 36 is obtained at the time of construction of the mold bed by locating two strips of wood within the bed 34 having identical notches along its length corresponding to the spacing of the plates 36 and within which the bottom edge of the plates 36 fit. A third identically notched board is then placed over the upper edges of the plates and thereby interlocks each of the plates. By then using a level and square which locates one of the plates in true perpendicular position, all of the remaining interconnected plates will assume the same position parallel with the one plate. Therefore, all of the blocks produced in the bed are of uniform size and parallelism.

Concrete is then poured to a depth embedding the bottom edges of the plates 36 about three inches, thereby permanently locking the plates 36 at the proper spacing in parallel relation to each other, each being perpendicular to the bed 34. The resilient mold pieces 42 are next inserted within recesses at the bottom of the mold cavity and are locked in place at their ends by means of pins 44 also embedded in the concrete bed which are set at an angle to resist upward movement of the block when it is extracted vertically from the cavity. The mold piece 42 is constructed of an oil-resistant elastomeric material such as neoprene or the like and is hard, durable and abrasion resistant to withstand both the vertical load and drawing or tearing forces which are imposed on it during molding operation. We have found for this purpose that a neoprene or polyester base material of suitable oil resistance and having substantial silica loading is adequate for our purposes. A suitable mold piece, according to the physical requirements described, is obtainable from the Kaul Clay Products Co., of Toronto, Ohio, as used in the manufacture of prestoseal pipe.

It is essential that the mold piece 42 be both slightly resilient and oil resistant so as not to deform or swell while the concrete is hardening within the cavity to change the configuration of the mold cavity. After the concrete has been allowed to set for a period sufficient to permit removing of the dividers 40, the dividers 40 are lifted out of place, exposing the ends of the blocks 16 and 18 in the mold cavity.

When the blocks have hardened, usually 18 hours depending on temperature, the blocks are removed starting from the right- or left-hand sides of the mold bed shown in FIG. 3, the reason for this being that at least one of the plates 36 should not be held by a filled mold cavity, thus allowing one of the plates 36 to flex slightly and promote release of the block. The oil previously sprayed on plates 36 provides lubrication and permits sliding of the block vertically upwardly by brick lift tongs (not shown) which engage the exposed ends of the block. When the block is pulled upwardly, the ends of the resilient mold piece 42 held by pins 44 will first break away from the block and relieve any vacuum forces tending to hold the mold piece and block together. Such vacuum forces are relieved at the outset of extraction. Thereafter the mold piece undergoes a slight flexing into a concave shape, the central portion of the mold piece tending to cohere with the ornamental face 22 of the block. As the block is pulled vertically upwardly there is a peeling of the mold piece away from the block, thereby greatly reducing the release forces which would otherwise be required if simultaneous separation were effected between all portions of the bottom mold piece 42 and the face 22 of the finished block. In this way, we are able to remove the block while it is not fully cured without injuring the block.

It will be noted that all of the finished blocks are removable from the mold bed by disassembling the mold bed only to the extent of removing the separating plywood divider boards 40 so that the mold bed is ready for a new charge of concrete only by blowing out the sand and foreign material remaining after emptying of the mold cavities oiling and reinsertion of the dividers 40 which can be done very readily, and with minimum down time. Because the mold bed 32 can be returned in condition for a subsequent pour almost immediately upon removal of the finished blocks, it is possible to increase the productivity time of the mold bed and the labor costs of the operation are reduced since the mold bed itself is not extensively assembled and disassembled for each pouring operation.

It should be understood that the invention is not limited to a specific dimension, ornamental configuration or size of the building blocks. Likewise, the mold bed can be modified, as design requires, to include more or less mold cavities and the materials of composition are likewise variable. For example, the dividers 40 can be either wood or metal and the plates 36 likewise vary in material of construction as long as the material has a comparable strength and limited flexibility equivalent to a steel plate of about twelve gauge or the like.

The resulting product which is obtained is of uniform quality, being of substantial strength and low porosity and the dimensional accuracy of constructing the article is within very narrow tolerance limitations. Thus, the building blocks can be readily constructed into a wall of accurate dimension and with minimum compensation for dimensional variations.

Although the present invention has been described in connection with certain selected example embodiments thereof, it will be understood that these are illustrative of the invention and are by no means restrictive of the invention. It is reasonably to be expected that those skilled in this art can make numerous revisions and changes of the invention to suit individual design requirements, and it is intended therefore that such revisions and changes which incorporate the disclosed principles will be included within the scope of the following claims as equivalents of the invention.

We claim:

1. A mold bed for producing a plurality of cementitious products each having at least one ornamental contoured face and comprising a plurality of spaced apart rigidly supported members providing a plurality of sides defining mold cavities, removable members defining other sides of said mold cavities and adapted when removed to expose surfaces of the molded products within the respective mold cavities where mold-cavity extractive forces are communicated to said products, and resilient mold pieces disposed at the base of the respective mold cavities and held nonuniformly along their length, and which are deformed by the extractive forces exerted on said products as said respective mold pieces cling cohesively to the products, whereby the resilient mold pieces are stripped away from the ornamental faces replicated by said resilient mold pieces as the products are removed, and a concrete base, said rigidly supported members being embedded along one edge thereof within said concrete base.

2. The mold bed in accordance with claim 1 wherein one of said removable members is constituted by a mold member having an ornamental face which forms an angle with the ornamental face provided by said resilient mold whereby the cementitious product is adapted as a cornerstone.

3. The mold bed in accordance with claim 1 wherein said resilient mold includes a raised edge along two of the intersecting sides thereof to impart a mortarlike appearance to the product face in contact therewith.

4. The mold bed in accordance with claim 1 wherein said rigidly supported members defining one dimension of said molded product and spaced gaps are provided along the length of said rigidly supported members wherein removable members are slidably received therein.

5. The mold bed in accordance with claim 1 including fastening means located one at each end of said resilient mold piece and held by said concrete base, to provide lifting of the center portion of the resilient mold piece and separation at the ends from the molded article during extraction thereof whereby the resilient mold piece is gradually stripped from the molded article.